United States Patent
Wroblewski et al.

(10) Patent No.: US 11,117,781 B2
(45) Date of Patent: Sep. 14, 2021

(54) VERTICAL BOUNCE DETECTION AND MITIGATION

(71) Applicant: Otis Elevator Company, Farmington, CT (US)

(72) Inventors: Marcin Wroblewski, Burlington, CT (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 718 days.

(21) Appl. No.: 15/968,916

(22) Filed: May 2, 2018

(65) Prior Publication Data

US 2019/0337756 A1 Nov. 7, 2019

(51) Int. Cl.
*B66B 1/28* (2006.01)
*B66B 1/32* (2006.01)
(Continued)

(52) U.S. Cl.
CPC ........... *B66B 1/285* (2013.01); *B66B 1/32* (2013.01); *B66B 1/3407* (2013.01);
(Continued)

(58) Field of Classification Search
CPC ......... B66B 1/285; B66B 1/32; B66B 1/3407; B66B 5/16; B66B 1/3453; B66B 5/0012;
(Continued)

(56) References Cited

U.S. PATENT DOCUMENTS 3,986,127 A * 10/1976 Ray .................. H03H 11/1217
327/344
4,765,648 A * 8/1988 Mander ................ B60G 17/018
267/64.18
(Continued)

FOREIGN PATENT DOCUMENTS

CN 101531305 A 9/2009
EP 2824056 A1 1/2015
(Continued)

OTHER PUBLICATIONS

EP Application No. 19172332.9 Extended EP Search Report dated Mar. 31, 2020, 6 pages.
(Continued)

*Primary Examiner* — Jeffrey Donels
(74) *Attorney, Agent, or Firm* — Cantor Colburn LLP (57) ABSTRACT

A vertical bounce detection system of an elevator system includes at least one sensor operable to detect vertical movement of an elevator car in a hoistway. The vertical bounce detection system also includes a processing system communicatively coupled to the at least one sensor and a memory system having instructions stored thereon that, when executed by the processing system, cause the vertical bounce detection system to determine a bounce energy level of the elevator car based on sensor data from the at least one sensor. The instructions further cause the vertical bounce detection system to compare the bounce energy level to a bounce condition threshold. A speed reduction of the elevator car is commanded to continue movement of the elevator
(Continued)

car at a reduced speed based on determining that the bounce energy level exceeds the bounce condition threshold.

18 Claims, 6 Drawing Sheets

(51) Int. Cl.
  *B66B 1/34* (2006.01)
  *B66B 5/16* (2006.01)
  *G05B 19/404* (2006.01)
(52) U.S. Cl.
  CPC .............. *B66B 1/3453* (2013.01); *B66B 5/16* (2013.01); *G05B 19/404* (2013.01); *G05B 2219/45014* (2013.01)
(58) Field of Classification Search
  CPC ... B66B 5/0018; B66B 1/3423; B66B 1/3446; G05B 19/404; G05B 2219/45014
  See application file for complete search history.

(56) References Cited

U.S. PATENT DOCUMENTS

| | | | |
|---|---|---|---|
| 5,436,838 A * | 7/1995 | Miyamori | B60R 21/0132 180/282 |
| 5,750,945 A | 5/1998 | Fuller et al. | |
| 5,758,301 A * | 5/1998 | Saito | B60R 21/0132 180/274 |
| 5,828,014 A | 10/1998 | Goto et al. | |
| 7,621,377 B2 | 11/2009 | Husmann | |
| 8,566,272 B2 * | 10/2013 | Fukumoto | G06N 5/02 706/54 |
| 8,631,909 B2 | 1/2014 | Draper et al. | |
| 8,827,044 B2 | 9/2014 | Marvin et al. | |
| 8,939,262 B2 | 1/2015 | Schienda et al. | |
| 2015/0321880 A1 | 11/2015 | Schonauer | |
| 2016/0145074 A1 | 5/2016 | Kattainen et al. | |
| 2019/0337759 A1 * | 11/2019 | Dube | B66B 5/0012 |

FOREIGN PATENT DOCUMENTS

| | | |
|---|---|---|
| EP | 2835334 A1 | 2/2015 |
| EP | 3564170 A1 | 11/2019 |
| ES | 2169988 A1 | 7/2002 |
| JP | 6183660 A | 7/1994 |
| JP | 6263358 A | 9/1994 |
| JP | H0967071 A | 3/1997 |
| JP | H0316319 A | 12/1998 |
| JP | 11139709 A | 5/1999 |
| JP | 2008308271 A | 12/2008 |
| JP | 201669094 A | 5/2016 |
| WO | 2014124838 A1 | 8/2014 |

OTHER PUBLICATIONS

CN Application No. 201910371497.0 Second Office Action dated Mar. 10, 2021, 10 pages (translated).

* cited by examiner

VERTICAL BOUNCE DETECTION AND MITIGATION

BACKGROUND

The embodiments herein relate to elevator systems and, more particularly, to vertical bounce detection and mitigation in elevator systems.

Elevator systems typically include an elevator car that moves within a hoistway to transport passengers or items between various levels in a building. Guide rails mounted within the hoistway can guide the elevator car within the hoistway. The elevator car can include a plurality of roller guides or slide guides that guide the car along each guide rail. Elevator systems can include an emergency braking system operable to engage one or more guiderails if an emergency stop condition is detected.

Elevator car bouncing, which can be caused by passengers jumping or item movement within an elevator car, may trigger an unnecessary tripping of the emergency braking system. For example, an elevator system with a governor system may act on an oscillating acceleration as an overspeed condition, resulting in an otherwise unneeded stoppage of the elevator car within the hoistway, potentially between floors.

BRIEF SUMMARY

According to an embodiment, a vertical bounce detection system of an elevator system includes at least one sensor operable to detect vertical movement of an elevator car in a hoistway. The vertical bounce detection system also includes a processing system communicatively coupled to the at least one sensor and a memory system having instructions stored thereon that, when executed by the processing system, cause the vertical bounce detection system to determine a bounce energy level of the elevator car based on sensor data from the at least one sensor. The instructions further cause the vertical bounce detection system to compare the bounce energy level to a bounce condition threshold. A speed reduction of the elevator car is commanded to continue movement of the elevator car at a reduced speed based on determining that the bounce energy level exceeds the bounce condition threshold.

In addition to one or more of the features described herein, or as an alternative, further embodiments include where the at least one sensor, the processing system, and the memory system are components of a safety actuator operable to apply a braking force to an element of the elevator system.

In addition to one or more of the features described herein, or as an alternative, further embodiments include where the bounce condition threshold is set to trip the speed reduction prior to crossing an over-speed condition operable to apply the braking force by engaging a braking system of the safety actuator.

In addition to one or more of the features described herein, or as an alternative, further embodiments include where the speed reduction of the elevator car is commanded by outputting a speed reduction request on a communication interface.

In addition to one or more of the features described herein, or as an alternative, further embodiments include where the vertical bounce detection system is configured to restore a normal operating speed of the elevator car after a speed restoration condition is met.

In addition to one or more of the features described herein, or as an alternative, further embodiments include where the speed restoration condition includes one or more of: a request to travel to a next desired floor after halting the elevator car, and a confirmation that vertical bouncing is reduced after the speed reduction of the elevator car.

In addition to one or more of the features described herein, or as an alternative, further embodiments include where the vertical bounce detection system is configured to apply a bandpass filter to the sensor data and a lowpass filter to an output of the bandpass filter.

In addition to one or more of the features described herein, or as an alternative, further embodiments include where the sensor data includes acceleration data and the vertical bounce detection system is configured to apply a squaring function to the output of the bandpass filter prior to applying the lowpass filter to determine the bounce energy level based on the acceleration data.

In addition to one or more of the features described herein, or as an alternative, further embodiments include where the lowpass filter includes an integrator.

In addition to one or more of the features described herein, or as an alternative, further embodiments include where the at least one sensor includes one or more of: an accelerometer, a velocity sensor, or a position sensor.

According to an embodiment, a method of vertical bounce detection in an elevator system can include receiving sensor data indicative of vertical movement of an elevator car in a hoistway of the elevator system. A bounce energy level of the elevator car is determined based on the sensor data. The bounce energy level is compared to a bounce condition threshold. A speed reduction of the elevator car is commanded to continue movement of the elevator car at a reduced speed based on determining that the bounce energy level exceeds the bounce condition threshold.

Technical effects of embodiments of the present disclosure include vertical bounce detection in an elevator system prior to tripping an otherwise unneeded emergency braking condition, and commanding a speed reduction of an elevator car to continue movement of the elevator car at a reduced speed.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
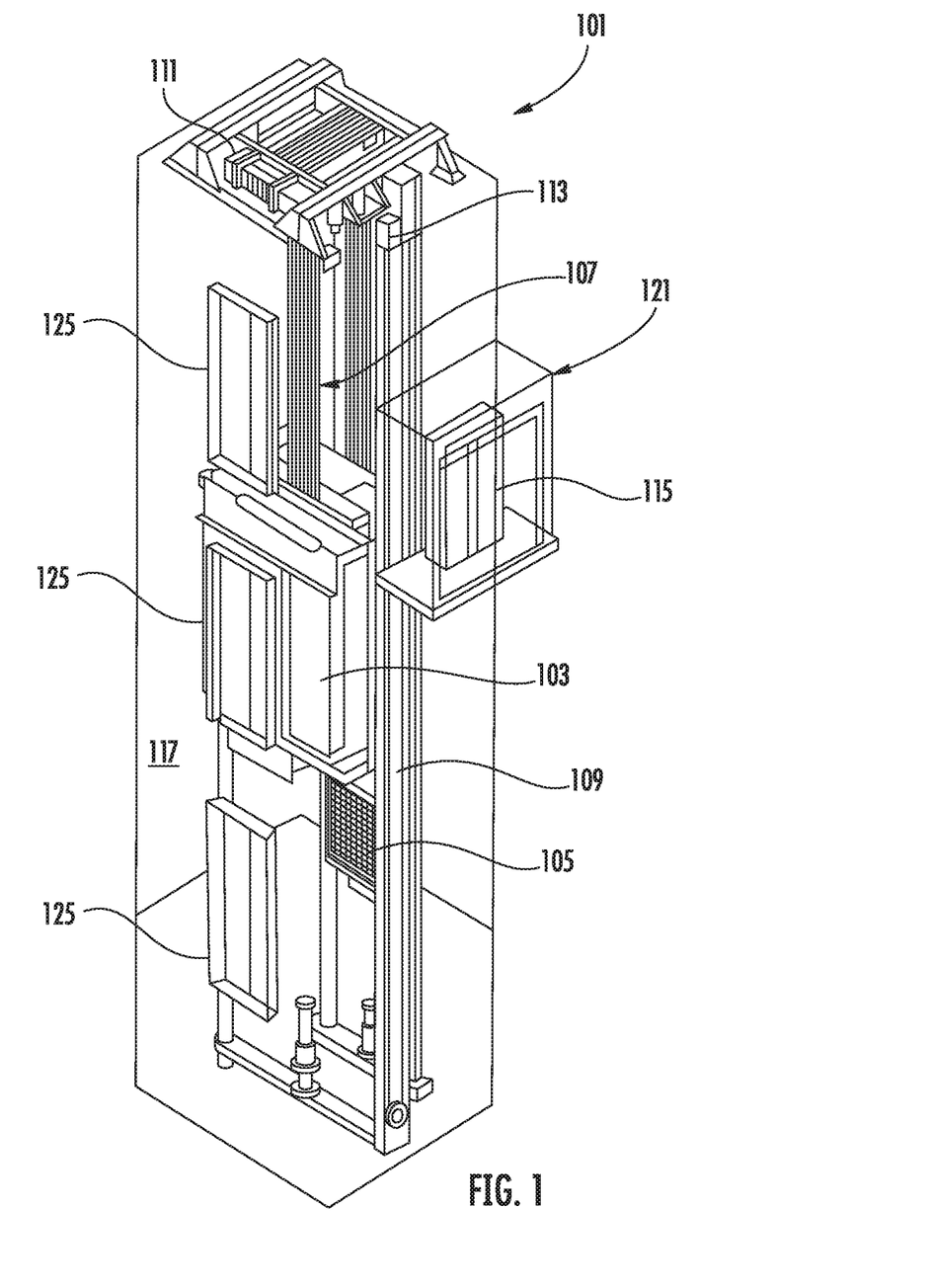
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 (also referred to as hoistway 117) and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113. When moving up or down within the elevator shaft 117 along guide rail 109, the elevator car 103 may stop at one or more landings 125 (e.g., floors) as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. FIG. 1 is merely a non-limiting example presented for illustrative and explanatory purposes.

Figure 2:
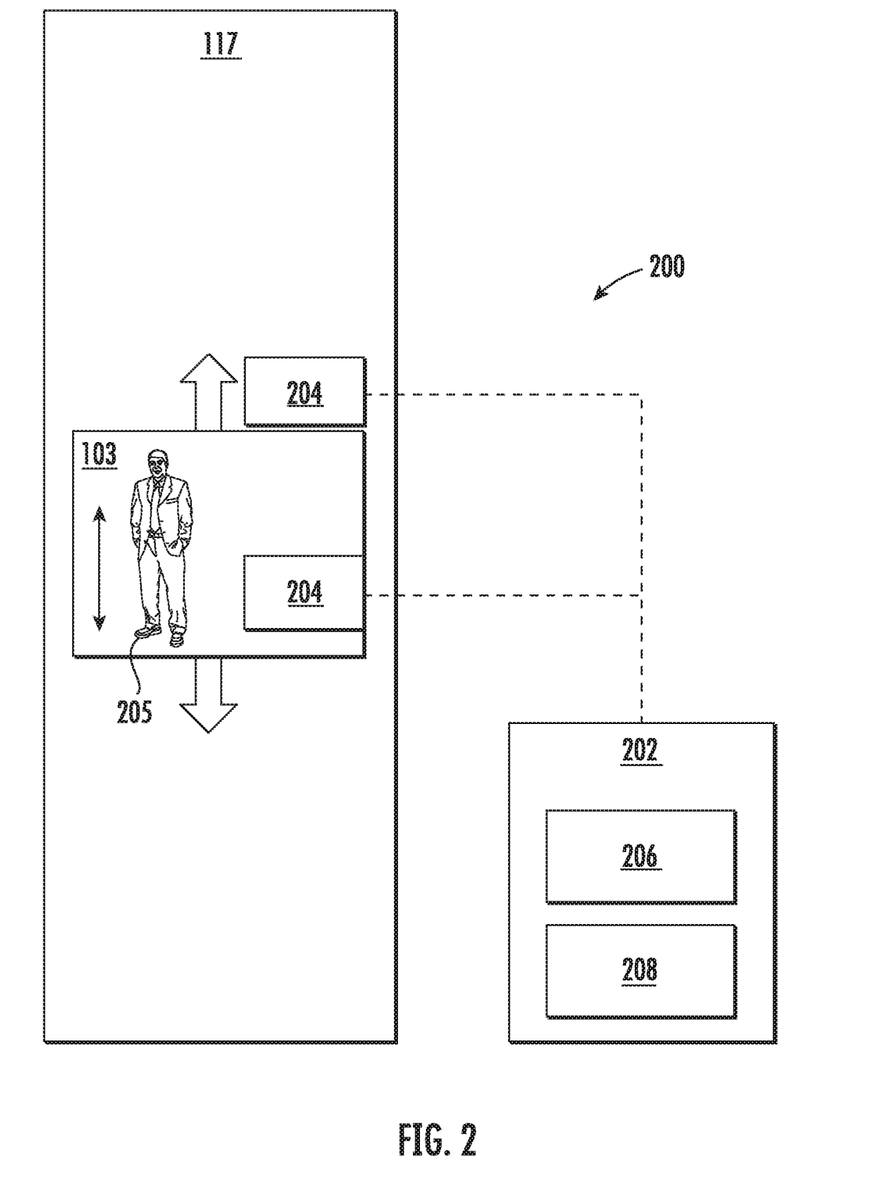
FIG. 2 is a schematic block diagram illustrating a system that may be configured in accordance with one or more embodiments of the present disclosure.

Turning now to FIG. 2, a schematic illustration of a vertical bounce detection system 200 in an example embodiment of the present disclosure is shown. A controller 202 of the vertical bounce detection system 200 is an example of a vertical bounce detection controller that interfaces with at least one sensor 204 operable to detect vertical movement of elevator car 103 in a hoistway 117 of an elevator system, such as elevator system 101 of FIG. 1. Vertical bouncing of the elevator car 103 may be induced by movement of at least one item or person 205 within the elevator car 103, such as the person 205 jumping within the elevator car 103. The controller 202 can be an embodiment of the controller 115 of FIG. 1 or may be a separate device that interfaces with controller 115. The controller 202 includes a processing system 206 communicatively coupled to the at least one sensor 204 and a memory system 208 having a plurality of instructions stored thereon. The at least one sensor 204 may be located within the elevator car 103 and/or otherwise be coupled to the elevator car 103 (e.g., externally attached to the elevator car 103). The at least one sensor 204 can include, for example, one or more of: an accelerometer, a velocity sensor, or a position sensor. The controller 202 can be located within the elevator car 103 or may be external to the elevator car 103, including any communication network accessible location, such as in the cloud.

The processing system 206 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 208 may be a storage device such as, for example, a random access memory (RAM), read only memory (ROM), or other electronic, optical, magnetic or any other computer readable storage medium configured to store executable instructions in a non-transitory form. In some embodiments, all or a portion of the processing described in reference to controller 202 can be performed using analog circuits.

The controller 202 may control movement of the elevator car 103 by commanding the machine 111 of FIG. 1 to raise or lower the elevator car 103 to a desired floor. The desired floor may be one of the landings 125 of FIG. 1, where a call button was pressed, may be selected through a user interface (not depicted) of the elevator car 103, or otherwise dispatched. Although only a single instance of the elevator car 103 is depicted in the example of FIG. 2, it will be understood that groups of elevator cars 103 may exist within the same building/structure.

When executed by the processing system 206, instructions stored on the memory system 208 cause the vertical bounce detection system 200 to determine a bounce energy level of the elevator car 103 based on a plurality of sensor data from the at least one sensor 204, compare the bounce energy level to a bounce condition threshold, and command a speed reduction of the elevator car 103 to continue movement of the elevator car 103 at a reduced speed based on the bounce energy level exceeding the bounce condition threshold. Further details are provided with respect to FIGS. 3-7.

Figure 3:
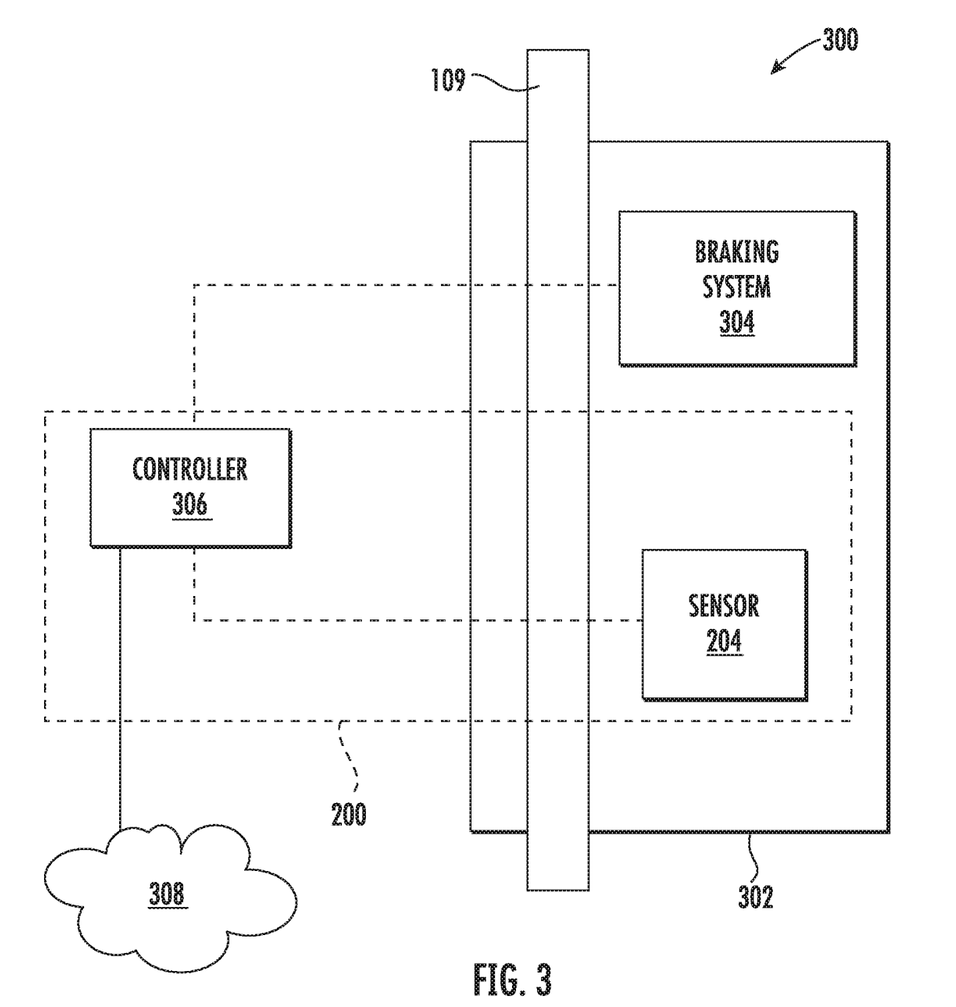
FIG. 3 is a schematic illustration of a safety actuator system in accordance with an embodiment of the present disclosure.

Referring to FIG. 3, a safety actuator system 300 is depicted that includes a safety actuator 302 operable to apply a braking force to an element of the elevator system 101 of FIG. 1, such as the guide rail 109 or a component of the machine 111 of FIG. 1, for example. The safety actuator 302 can be coupled to the elevator car 103 of FIGS. 1 and 2. In the example of FIG. 3, sensor 204 is part of the safety actuator 302 along with a braking system 304 which may include brake elements and/or activation magnets. A controller 306 can include all or a portion of the controller 202 (FIG. 2) of the vertical bounce detection system 200. Further, the controller 306 can be a local control of the safety actuator 302. For example, the controller 306 may only include sensor monitoring and braking actuation functions for the safety actuator 302, while other control functions of the elevator car 103 are managed by the controller 115 and/or controller 202 of FIGS. 1 and 2. The controller 306 can be configured to trigger the braking system 304 to engage the guide rail 109 responsive to detecting an over-speed condition based on sensor data from the sensor 204 of the safety actuator 302. In some embodiments, the controller 306 also monitors the sensor 204 for vertical bounce and may command a speed reduction of the elevator car 103 by outputting a speed reduction request on a communication interface 308 or directly command the speed reduction if incorporated in the controller 115 of FIG. 1. The communication interface 308 may include wired and/or wireless communication support, such as a communication bus accessible by controllers 115, 202, and/or machine 111 of FIG. 1.

The safety actuator 302 may be an electronic safety actuator or can be implemented using any type of over-speed governor components and need not be limited to an electronic system. For example, the braking system 304 can use flyballs or flyweights that extend when a predetermined force level is applied to actuate a motor brake to apply a braking force. One or more switches (not depicted) can be used to trigger braking and/or depowering of the machine 111 of FIG. 1 as part of over-speed protection. In some embodiments of the safety actuator 302, the sensor or sensors 204 may be located external to the safety actuator 302, such as in a mechanical over-speed governor implementation.

Figure 4:
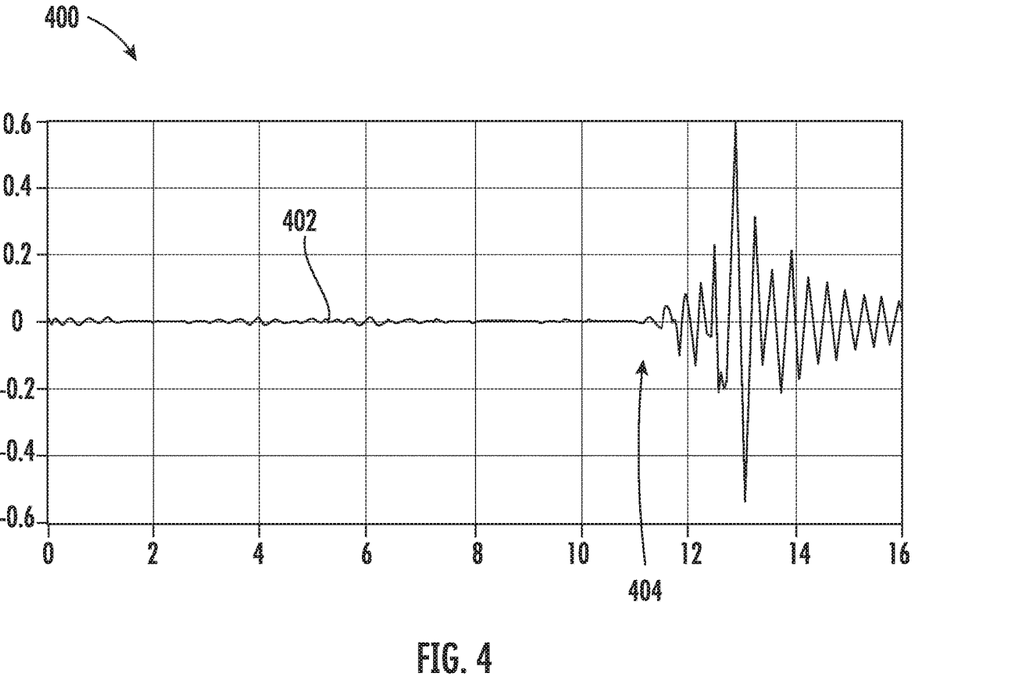
FIG. 4 is a plot of filtered sensor data that can be acquired in accordance with an embodiment of the present disclosure.
Figure 5:
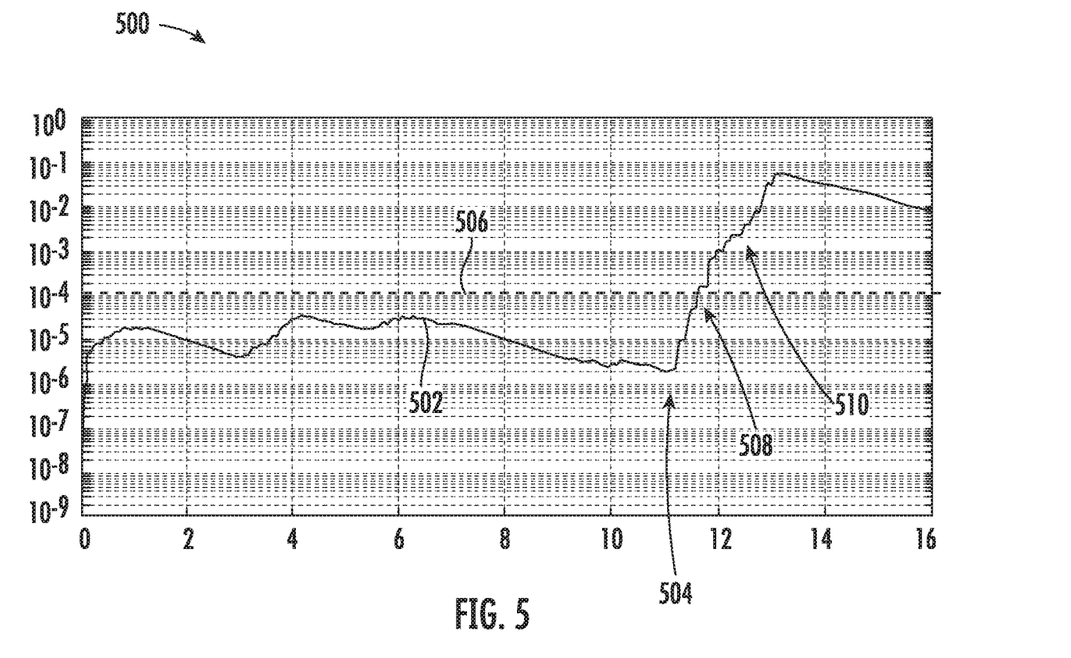
FIG. 5 is a plot of bounce energy level that can be determined in accordance with an embodiment of the present disclosure.
Figure 6:
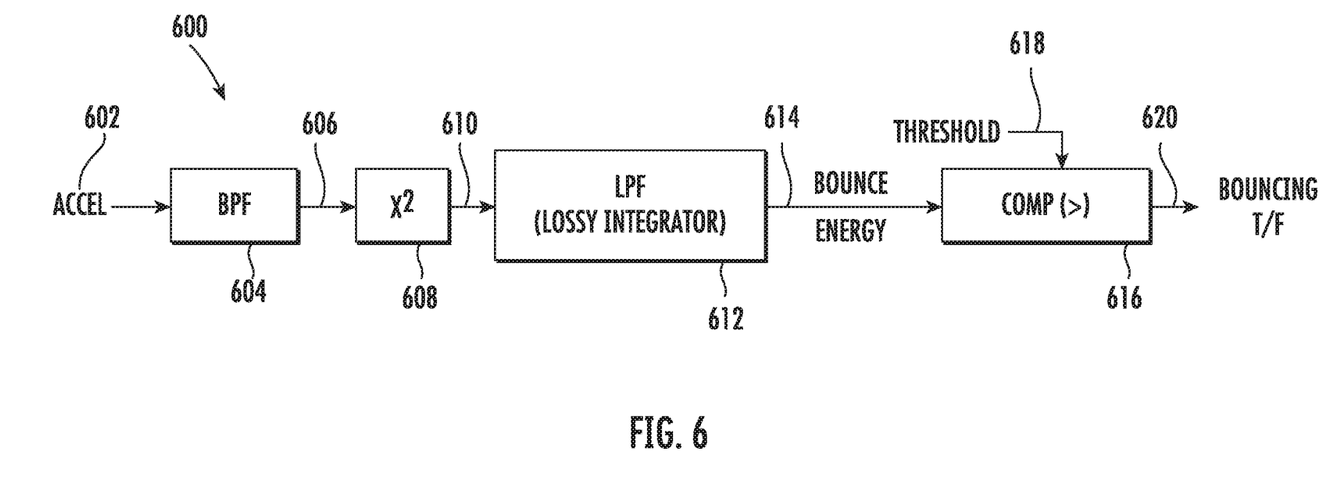
FIG. 6 is a block diagram of a vertical bounce detection dataflow in accordance with an embodiment of the present disclosure.

Referring now to FIGS. 4-6, a block diagram of a vertical bounce detection dataflow 600 is depicted in FIG. 6 that can be implemented by controller 202 and/or controller 306 of FIGS. 2 and 3. For example, the vertical bounce detection dataflow 600 can be implemented using analog and/or digital circuitry. The vertical bounce detection dataflow 600 is illustrated as an example where a sensor 204 of FIGS. 2 and 3 provide acceleration data as sensor data 602 to a bandpass filter 604 to produce filtered sensor data 606. An example of filtered sensor data 606 is depicted in plot 400 of FIG. 4 as filtered sensor data 402. As one example, corner frequencies of the bandpass filter 604 can be set to extract content between one and four Hertz to detect low frequency bouncing. The frequency range of the bandpass filter 604 can be tuned depending upon frequencies of interest, such as resonant frequencies of components of the elevator system 101 of FIG. 1. In embodiments where the sensor 204 is not an accelerometer, additional processing steps may be used to convert the sensor data 602 into acceleration data. For instance, a derivative operation can be performed on a velocity signal to produce an acceleration signal, or a second-derivative operation can be performed on a position signal. Other signal variations and corresponding operations are contemplated.

In some embodiments, a function, such as a squaring function 608, can be applied to the filtered sensor data 606 to approximate an energy signal as an output 610, which may be further filtered by a lowpass filter 612 to produce a bounce energy level 614. In some embodiments, the lowpass filter 612 can be implemented as a lossy integrator, for instance, in an operational amplifier based circuit. The lowpass filter 612 can be used to further attenuate higher frequency noise and/or provide anti-aliasing for digital sampling. An example of the bounce energy level 614 is depicted in the plot 500 of FIG. 5 as a bounce energy level 502 with respect to time. The bounce energy level 614 can be compared by a comparator 616 with respect to a bounce condition threshold 618 to produce a vertical bouncing determination 620. The bounce condition threshold 618 can vary from system to system and may need to be specifically calibrated for each elevator car installation, due to custom tuning of systems, as well as dynamics parts contributing to the different characteristics of bounce conditions for various installations, such as belts vs. ropes and the like. The bounce condition threshold 618 can be set to a value that is determined to be as low as possible without causing false trips during normal operation (i.e., no bouncing conditions), which can result in the greatest possible time available for communicating the detected bounce condition before an emergency stop is unavoidable.

In embodiments, the bounce condition threshold 618 can be set to trip a speed reduction of the elevator car 103 prior to crossing an over-speed condition operable to apply a braking force by engaging the braking system 304 of the safety actuator 302 of FIG. 3. For instance, with respect to time, a bouncing event can start at time 404 of FIG. 4, which maps to time 504 of FIG. 5. A threshold level 506 of FIG. 5 is an example of the bounce condition threshold 618, where the bounce energy level 502 crosses the threshold level 506 at time 508 and may otherwise cross an over-speed condition at time 510 if the speed of the elevator car 103 is not reduced. Upon a speed reduction, e.g., ⅓ of the normal operating speed, the addition of vertical bouncing energy by a person 205 of FIG. 2 may be insufficient to cross an over-speed condition, and thus an otherwise unneeded activation of the safety actuator 302 of FIG. 3 is avoided. Speed reduction values and ranges can be determined based on system and/or installation characteristics to optimize operation, as well as preventing unnecessary emergency stops even after speed reduction. Examples of speed reductions include ⅓, ⅕, and/or ⅔ speed reductions of the normal operating speed, with other reduction values contemplated.

Figure 7:
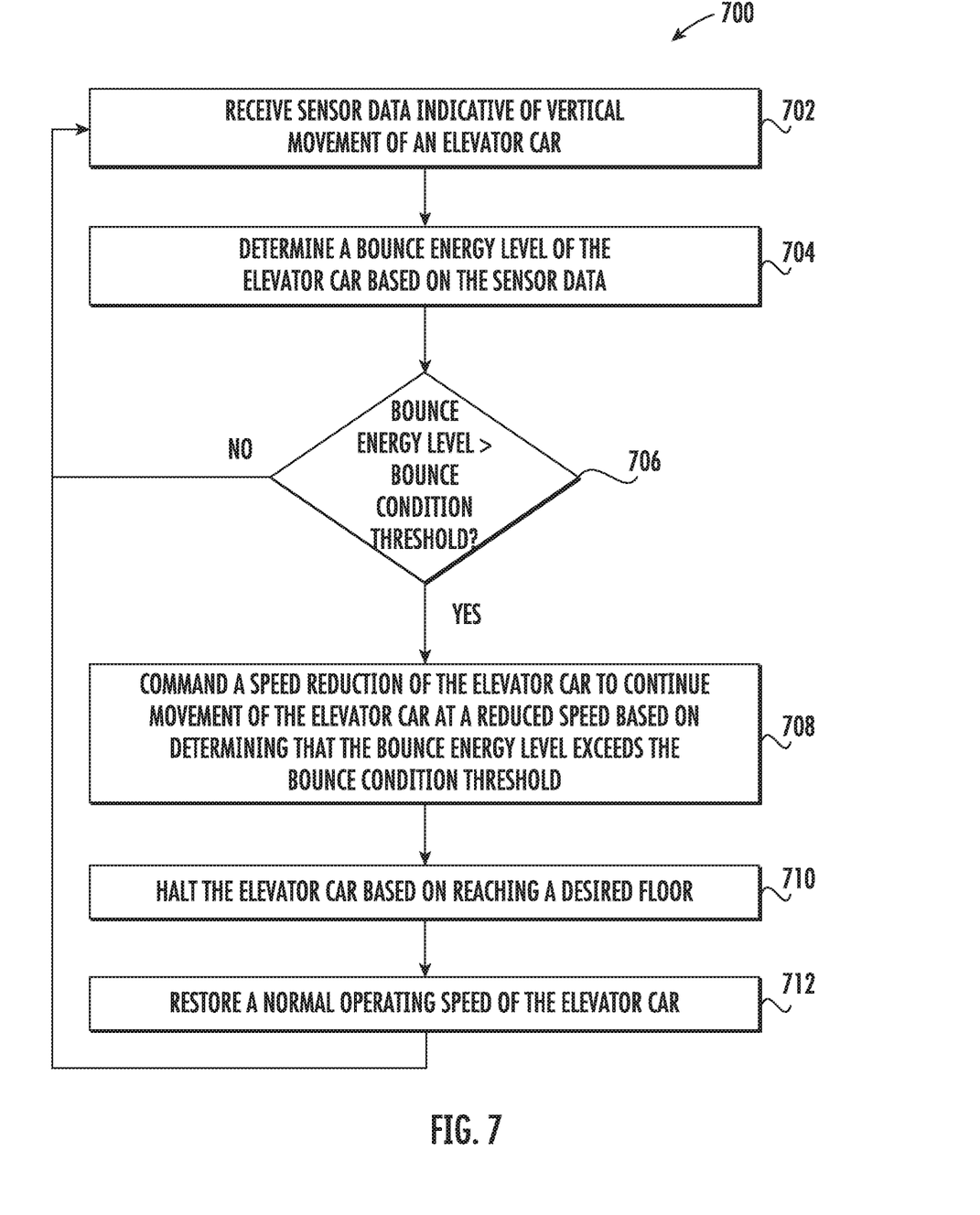
FIG. 7 illustrates a flow process in accordance with an embodiment of the present disclosure.

Turning now to FIG. 7, a flow process 700 in accordance with an embodiment of the present disclosure is shown. Flow process 700 may incorporate additional or alternative steps without departing from the scope of the present disclosure. The flow process 700 may be performed by one or more of the controller 115, 202, 306 of FIGS. 1-3 as a method of vertical bounce detection in an elevator system, such as the elevator system 101 of FIG. 1. Accordingly, flow process 700 is described in reference to FIGS. 1-7. For purposes of explanation, the flow process 700 is described with respect to controller 202 of FIG. 2.

At block 702, controller 202 receives a plurality of sensor data 602 indicative of vertical movement of an elevator car 103 in a hoistway 117 of the elevator system 101. At block 704, controller 202 determines a bounce energy level 614 of the elevator car 103 based on the sensor data 602. The bounce energy level 614 may be determined by applying a bandpass filter 604 to the sensor data 602, applying a squaring function 608 to an output (e.g., filtered sensor data 606) of the bandpass filter 604, and applying a lowpass filter 612 to an output 610 of the squaring function 608.

At block 706, controller 202 can compare the bounce energy level 614 to a bounce condition threshold 618, for instance, using comparator 616. At block 708, controller 202 can command a speed reduction of the elevator car 103 to continue movement of the elevator car 103 at a reduced speed based on the bounce energy level 614 exceeding the bounce condition threshold 618. The speed reduction of the elevator car 103 can be commanded by outputting a speed reduction request on a communication interface, such as the communication interface 308.

At block 710, the elevator car 103 can be halted based on reaching a desired floor or landing 125. At block 712, controller 202 can restore a normal operating speed of the elevator car 103 after a speed restoration condition is met, such as requesting travel to a next desired floor after halting. As another example of a speed restoration condition, if the vertical bouncing is reduced by a predetermined amount after the speed reduction of the elevator car 103, the controller 202 can increase the speed of the elevator car 103 prior to reaching a desired floor, for instance, in a high-rise building application. Further, if vertical bouncing is detected while the elevator car 103 is stationary, requesting travel to a next desired floor may not be permitted, which is an example of a not meeting a speed restoration condition due to new/continued detection of vertical bouncing.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A vertical bounce detection system of an elevator system, the vertical bounce detection system comprising:
   at least one sensor operable to detect vertical movement of an elevator car in a hoistway of the elevator system;
   a processing system communicatively coupled to the at least one sensor; and
   a memory system having a plurality of instructions stored thereon that, when executed by the processing system, cause the vertical bounce detection system to:
   determine a bounce energy level of the elevator car based on sensor data from the at least one sensor;
   compare the bounce energy level to a bounce condition threshold; and
   command a speed reduction of the elevator car to continue movement of the elevator car at a reduced speed based on determining that the bounce energy level exceeds the bounce condition threshold; and
   wherein the at least one sensor, the processing system, and the memory system are components of a safety actuator operable to apply a braking force to an element of the elevator system.

2. The vertical bounce detection system of claim 1, wherein the bounce condition threshold is set to trip the speed reduction prior to crossing an over-speed condition operable to apply the braking force by engaging a braking system of the safety actuator.

3. The vertical bounce detection system of claim 1, wherein the speed reduction of the elevator car is commanded by outputting a speed reduction request on a communication interface.

4. The vertical bounce detection system of claim 1, wherein the vertical bounce detection system is configured to restore a normal operating speed of the elevator car after a speed restoration condition is met.

5. The vertical bounce detection system of claim 4, wherein the speed restoration condition comprises one or more of: a request to travel to a next desired floor after halting the elevator car, and a confirmation that vertical bouncing is reduced after the speed reduction of the elevator car.

6. A vertical bounce detection system of an elevator system, the vertical bounce detection system comprising:
   at least one sensor operable to detect vertical movement of an elevator car in a hoistway of the elevator system;
   a processing system communicatively coupled to the at least one sensor; and
   a memory system having a plurality of instructions stored thereon that, when executed by the processing system, cause the vertical bounce detection system to:
   determine a bounce energy level of the elevator car based on sensor data from the at least one sensor,
   wherein the vertical bounce detection system is configured to apply a bandpass filter to the sensor data and a lowpass filter to an output of the bandpass filter;

compare the bounce energy level to a bounce condition threshold; and command a speed reduction of the elevator car to continue movement of the elevator car at a reduced speed based on determining that the bounce energy level exceeds the bounce condition threshold.

7. The vertical bounce detection system of claim 6, wherein the sensor data comprises acceleration data and the vertical bounce detection system is configured to apply a squaring function to the output of the bandpass filter prior to applying the lowpass filter to determine the bounce energy level based on the acceleration data.

8. The vertical bounce detection system of claim 7, wherein the lowpass filter comprises an integrator.

9. The vertical bounce detection system of claim 1, wherein the at least one sensor comprises one or more of: an accelerometer, a velocity sensor, or a position sensor.

10. A method of vertical bounce detection in an elevator system, wherein the method is performed by a safety actuator operable to apply a braking force to an element of the elevator system, the method comprising:

receiving sensor data indicative of vertical movement of an elevator car in a hoistway of the elevator system;

determining a bounce energy level of the elevator car based on the sensor data;

comparing the bounce energy level to a bounce condition threshold; and commanding a speed reduction of the elevator car to continue movement of the elevator car at a reduced speed based on determining that the bounce energy level exceeds the bounce condition threshold.

11. The method of claim 10, wherein the bounce condition threshold is set to trip the speed reduction prior to crossing an over-speed condition operable to apply the braking force by engaging a braking system of the safety actuator.

12. The method of claim 10, wherein the speed reduction of the elevator car is commanded by outputting a speed reduction request on a communication interface.

13. The method of claim 10, further comprising:

restoring a normal operating speed of the elevator car after a speed restoration condition is met.

14. The method of claim 13, wherein the speed restoration condition comprises one or more of: a request to travel to a next desired floor after halting the elevator car, and a confirmation that vertical bouncing is reduced after the speed reduction of the elevator car.

15. The method of claim 10, further comprising:

applying a bandpass filter to the sensor data; and applying a lowpass filter to an output of the bandpass filter.

16. The method of claim 15, wherein the sensor data comprises acceleration data and further comprising:

applying a squaring function to the output of the bandpass filter prior to applying the lowpass filter to determine the bounce energy level based on the acceleration data.

17. The method of claim 16, wherein the lowpass filter comprises an integrator.

18. The method of claim 10, wherein the sensor data is received from one or more of: an accelerometer, a velocity sensor, or a position sensor.

* * * * *